United States Patent
Katon et al.

(10) Patent No.: US 10,843,210 B2
(45) Date of Patent: Nov. 24, 2020

(54) ULTRA-VARIABLE ADVANCED MANUFACTURING TECHNIQUES

(71) Applicant: Cobbler Technologies, Bangor, ME (US)

(72) Inventors: Andrew Katon, Bangor, ME (US); Timothy Abraham, Bangor, ME (US); Vincent Lewis, Bangor, ME (US)

(73) Assignee: Cobbler Technologies, Bangor, ME (US)

( * ) Notice: Subject to any disclaimer, the term of this patent is extended or adjusted under 35 U.S.C. 154(b) by 0 days.

(21) Appl. No.: 16/061,261

(22) PCT Filed: Dec. 9, 2016

(86) PCT No.: PCT/US2016/065997
§ 371 (c)(1),
(2) Date: Jun. 11, 2018

(87) PCT Pub. No.: WO2017/100692
PCT Pub. Date: Jun. 15, 2017

(65) Prior Publication Data
US 2018/0361406 A1    Dec. 20, 2018

Related U.S. Application Data

(60) Provisional application No. 62/266,075, filed on Dec. 11, 2015, provisional application No. 62/318,803, (Continued)

(51) Int. Cl.
*B05B 7/16* (2006.01)
*B05B 7/32* (2006.01)
(Continued)

(52) U.S. Cl.
CPC ............ *B05B 7/166* (2013.01); *B05B 7/0408* (2013.01); *B05B 7/32* (2013.01); *B05B 9/002* (2013.01);
(Continued)

(58) Field of Classification Search
CPC ......... B05B 7/166; B05B 7/0408; B05B 7/32; B05B 15/25; B05B 7/208; B05B 9/002;
(Continued)

(56) References Cited

U.S. PATENT DOCUMENTS 2,478,079 A    8/1949    Beasley et al.
4,544,279 A    10/1985    Rudolph
(Continued)

FOREIGN PATENT DOCUMENTS

CN    110267732 A    9/2019
WO    WO-2017100692 A1    6/2017

OTHER PUBLICATIONS

"European Application Serial No. 16874000.9, Response filed Oct. 16, 2018 to Communication Pursuant to Ruled 161(2) and 162 EPC", 14 pgs.
(Continued)

*Primary Examiner* — Lien M Ngo
(74) *Attorney, Agent, or Firm* — Schwegman Lundberg & Woessner, P.A.

(57) ABSTRACT

A system and method for delivering materials for deposition is described. The system includes reservoirs for holding materials, heating elements for liquefying the materials (unless they are to be delivered as solids). Once in a desired state, pressure and material delivery systems to move the materials to a deposition nozzle. In the deposition nozzle, or thereabouts, the materials combine and are prepared to be deposited. An agitation element is used to break up the material and push it out of the nozzle tip in an atomized or (Continued)

droplet form. Changes in the material composition/concentration result in adjustment in heat, pressure or deposition agitation.

10 Claims, 7 Drawing Sheets

Related U.S. Application Data filed on Apr. 6, 2016, provisional application No. 62/380,999, filed on Aug. 29, 2016.

(51) Int. Cl.
*B05B 9/00* (2006.01)
*B05B 9/03* (2006.01)
*B05B 12/14* (2006.01)
*B05B 15/25* (2018.01)
*B05B 7/04* (2006.01)
*B05C 5/00* (2006.01)
*B05D 1/12* (2006.01)
*B33Y 30/00* (2015.01)

(52) U.S. Cl.
CPC ............ *B05B 9/03* (2013.01); *B05B 12/1418* (2013.01); *B05B 15/25* (2018.02); *B05C 5/00* (2013.01); *B05D 1/12* (2013.01); *B33Y 30/00* (2014.12)

(58) Field of Classification Search
CPC ......... B05B 9/03; B05B 12/1418; B05C 5/00; B05D 1/12; B33Y 30/00
USPC ........ 222/1, 54, 52, 53, 145.7, 145.8, 146.2, 222/146.5
See application file for complete search history.

(56) References Cited

U.S. PATENT DOCUMENTS

| | | | |
|---|---|---|---|
| 4,548,507 A | 10/1985 | Mathis et al. | |
| 4,652,468 A | 3/1987 | Gould et al. | |
| 5,294,052 A * | 3/1994 | Kukesh | B05B 7/06 137/625.41 |
| 5,332,125 A * | 7/1994 | Schmitkons | B01F 15/00175 222/1 |
| 5,466,143 A | 11/1995 | Suzuki et al. | |
| 5,913,602 A | 6/1999 | Steele | |
| 7,147,361 B2 | 12/2006 | Cecala et al. | |
| 9,010,367 B2 * | 4/2015 | McCormick | G05D 11/005 137/565.29 |
| 9,200,741 B2 * | 12/2015 | Bondeson | B05C 11/1002 |
| 10,456,968 B2 * | 10/2019 | Mandel | B29C 64/118 |
| 2005/0276152 A1 | 12/2005 | Goode et al. | |
| 2012/0024687 A1 | 2/2012 | Bratina et al. | |
| 2014/0368574 A1 * | 12/2014 | La Vos | B41J 2/16552 347/25 |
| 2015/0093465 A1 * | 4/2015 | Page | B29C 64/393 425/132 |
| 2018/0228737 A1 * | 8/2018 | Giridhar | A61K 9/7007 |

OTHER PUBLICATIONS

"International Application Serial No. PCT/US2016/065997, International Preliminary Report on Patentability dated Jun. 21, 2018", 9 pgs.
"International Application Serial No. PCT/US2016/065997, International Search Report dated Feb. 17, 2017", 2 pgs.
"International Application Serial No. PCT/US2016/065997, Written Opinion dated Feb. 17, 2017", 7 pgs.
"Chinese Application Serial No. 201680081447.3, Office Action dated Jun. 11, 2019", w/o English translation, 2 pgs.
"European Application Serial No. 16874000.9, Extended European Search Report dated Oct. 28, 2019", 9 pgs.

* cited by examiner

ULTRA-VARIABLE ADVANCED
MANUFACTURING TECHNIQUES

PRIORITY AND RELATED APPLICATIONS

This application is a U.S. National Stage Filing under 35 U.S.C. 371 from International Application No. PCT/US2016/065997, filed on Dec. 9, 2016, and published as WO 2017/100692 on Jun. 15, 2017, which application claims the benefit of priority to U.S. Provisional Application Ser. No. 62/380,999 entitled "CONTROLLED MATERIAL COMBINATION AND DELIVERY IN ULTRA-VARIABLE ADVANCED MANUFACTURING SYSTEMS" filed on Aug. 29, 2016, to U.S. Provisional Application Ser. No. 62/318,803 entitled "ULTRA-VARIABLE ADVANCED MANUFACTURING SYSTEMS AND APPARATUS" filed on Apr. 6, 2016 and U.S. Provisional Application Ser. No. 62/266,075 entitled "ULTRA-VARIABLE ADVANCED MANUFACTURING SYSTEMS AND APPARATUS" filed on Dec. 11, 2015, each of which is hereby incorporated by reference herein in its entirety.

FIELD

The present inventive subject matter relates to the field of advanced manufacturing equipment and products made therefrom. More specifically, the present inventive subject matter relates to material delivery and management within the field.

BACKGROUND

Manufacturing

Mass manufacturing of foams, plastics and other similar materials is done generally through form extrusion, injection molding or other techniques requiring product-specific tooling and large production volumes. Even where machines can accommodate various forms and molds, change-over time and cost is still a concern and the cost and time to create of differing specific molds can make customization and variability quite difficult.

Footwear

More and more attention is being given to health and fitness than ever before. This is partly due to inefficiencies in the healthcare system and increase in individuals wishing to take control of their own health. We are seeing increasing numbers of first time exercisers, who more often than not, end up with injuries.

In other fields, we see large numbers of workers, law enforcement, and military personnel who spend most of their day on their feet. This places a lot of stress on joints and tendons, often leading to injuries. Such injuries in turn lead to lost wages, reduction in productivity and increased cost for the individual, employer and government.

Shoes are primarily designed to protect the wearer's feet. This protection wears down over time and requires replacement. In the case of running shoes, most manufacturers suggest replacement every 300 miles. The main reason for this is that shoe loses its ability to provide the appropriate level of shock absorption. This lack of shock absorption leads to greater strain on the wearer's joints and tendons, which in turn leads to injury.

DRAWINGS

Embodiments of inventive subject matter may be best understood by referring to the following description and accompanying drawings, which illustrate such embodiments. In the drawings.

DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Raw materials in a liquid or semi-liquid state undergo an enemy-driven phase transformation resulting in liquid atomization. The atomization can be caused by a collision of semi-liquid material and high-velocity gas. This collision breaks up a column of semi-liquid material into very fine droplets that are precisely deposited as a "mist". Other atomization techniques are considered within the scope of the inventive subject matter including actuation by piezo-electric elements, solenoids, acoustic elements, thermal elements and so on. Three-dimensional Atomized Particle Deposition (APD™) technology enables 3D-printing of functional multi-material products.

Systems and methods for controlling multiple types of material to impart a desired mix and concentration within a material deposition system are described herein. With the ability to manage solids, liquids and infusions with precision, desired output characteristics may be obtained.

Figure 1:
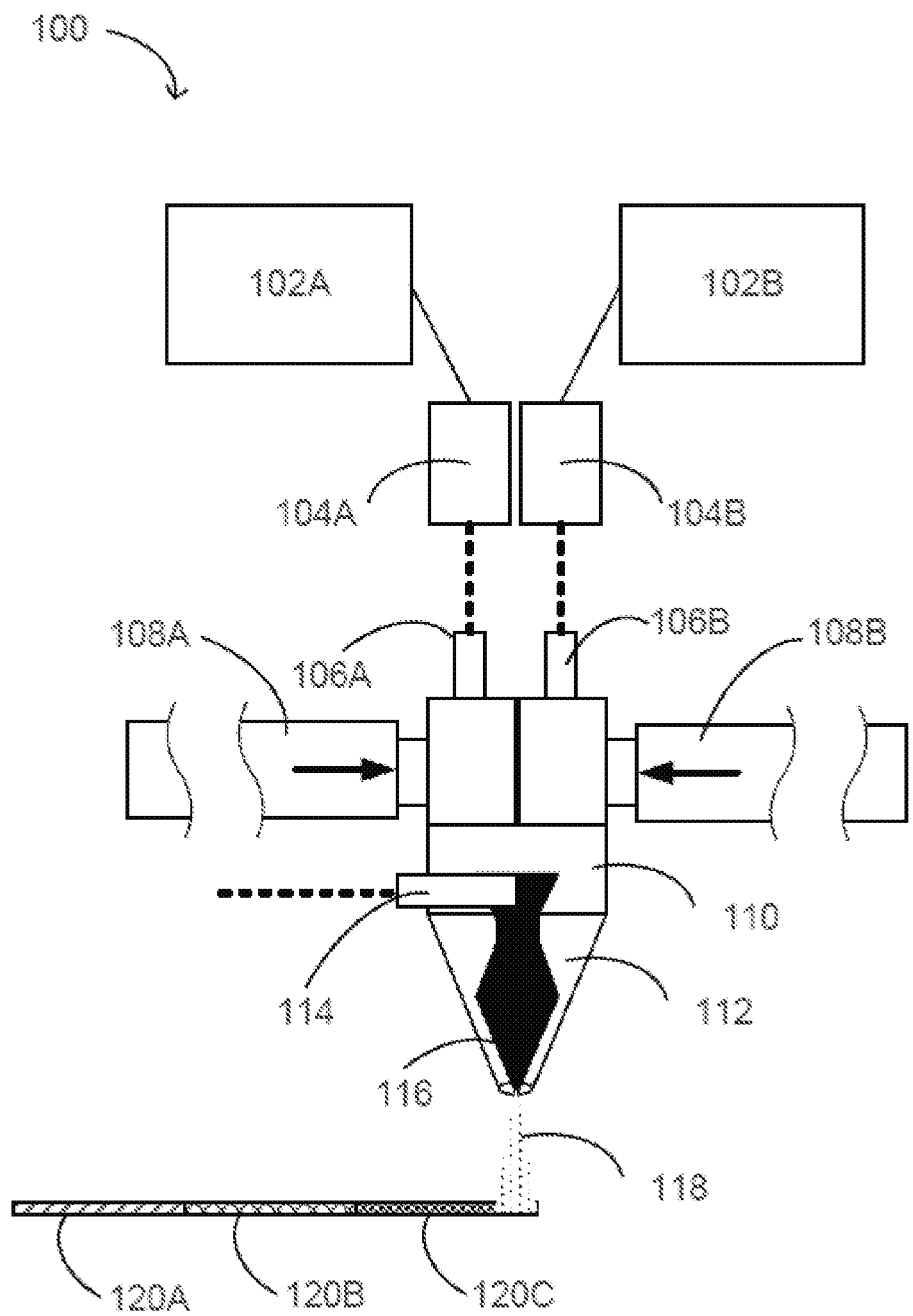
FIG. 1 is a diagram of a material deposition system according to various embodiments.

FIG. 1 is a block diagram of a material deposition system 100 according to various embodiments. The material deposition system 100 includes controllers 102A-B, control valves 104A-B, material control inputs 106A-B, material delivery channels 108A-B, deposition nozzle 110, nozzle tip 112, actuator control 114, and actuation element 116.

According to various embodiments, the controllers 102A-B are separate devices controlling the flow of their respective materials. Communication between the controllers 102A-B occurs especially when materials are mixed and one or the other must communicate with the actuator control 114. According to other embodiments, a single controller is used in place of multiple controllers 102A-B.

Referring to one half of the material deposition system 100, the controller 102A signals the control valve 104A to provide a control to the material control input 106A. The material control input 106A allows/restricts flow of material into the deposition nozzle 110 from the material delivery channel 108A. Once received in the deposition nozzle 110, the material may be processed singly or mixed with another material received through another material delivery channel 108B, a control signal from the controller 102A is received by the actuator control 114 to effect movement of the actuation element 116. Movement of the actuation element 116 serves to agitate the material and push it out of the deposition nozzle in a spray 118.

Adjustments made by the controllers 102A-B are used to vary the deposition material. As an example, the concentration of two materials may be adjusted during a print by adjusting temperature, pressure and/or flow rate of one or more of the materials. The movement of the actuation element 116 may also be adjusted to change droplet volume or velocity, effecting resolution. These changes may be made on the fly with the controllers 102A-B compensating for the material in the deposition nozzle 110 needing to be deposited before the adjusted material will reach the orifice of the deposition nozzle 110.

As an example, a first material may be deposited by itself as a first layer portion 120A, part way through the deposition of that first layer portion 120A, the controllers 102A-B can adjust the flow of a second material to create a 50/50 mix of the two materials which get deposited seamlessly as a second layer portion 120B with different material characteristics. Finally, the controller may signal one control valve 104A to shut off material flow of the first material, signaling the other control valve 104B to open flow of the second material. Once the mixture in the deposition nozzle 110 is fully deposited into the second layer portion 120B, a third layer portion 120C is seamlessly deposited in turn.

Figure 2:
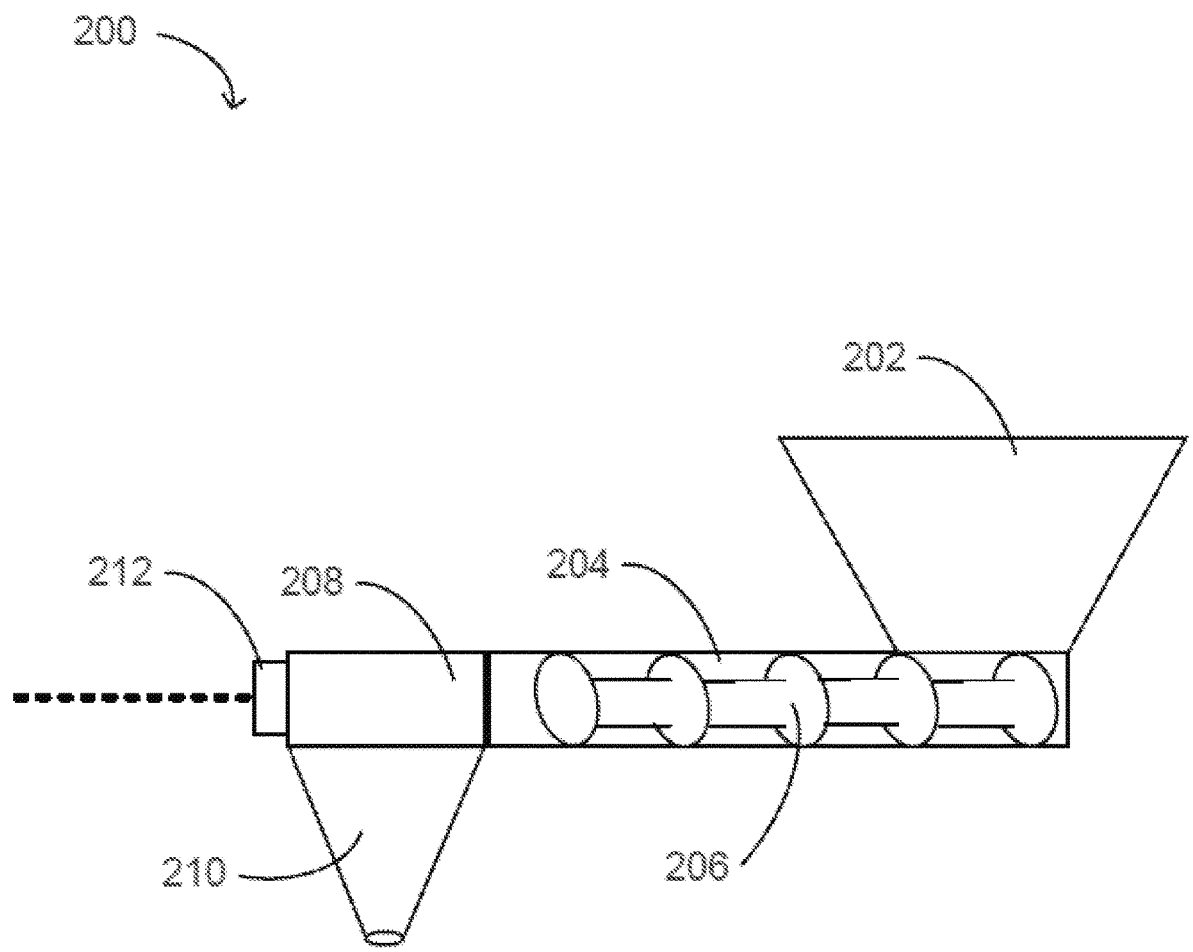
FIG. 2 is a diagram of an auger delivery and deposition element according to various embodiments.

FIG. 2 is a diagram of an auger delivery and deposition element 200 according to various embodiments. The auger delivery and deposition element 200 includes a hopper 202, fluid channel 204, auger 206, deposition nozzle body 208, nozzle tip 210, and deposition control input 212.

Material is provided to the auger delivery and deposition element 200 via the hopper 202. In some example embodiments, the hopper 202 may be an open vessel similar to as illustrated in FIG. 2. In other embodiments, the hopper 202 may be an enclosed chamber with one or more material inlet ports. The hopper 202 serves as a place for gather material as it is being delivered to the auger 206. The auger 206 is positioned within the fluid channel 204. The auger 206 is designed to rotate along its major axis within the fluid channel 204. Such rotation causes material from the hopper 202 to move along the auger 206 within the fluid channel 204 and away from the hopper 202. The auger 206 terminates at the deposition nozzle body 208 for controlled deposition through the nozzle tip 210. The deposition control input 212 receives a signal from a controller to actuate an element integral to the nozzle in order to deposit the material.

The auger delivery and deposition element 200 may be used to move a single material. Alternatively, the auger delivery and deposition element 200 may be used to move a mixed combination of materials, in which case, the motion of the materials across the auger 206 aids in the mixing of the materials.

Figure 3:
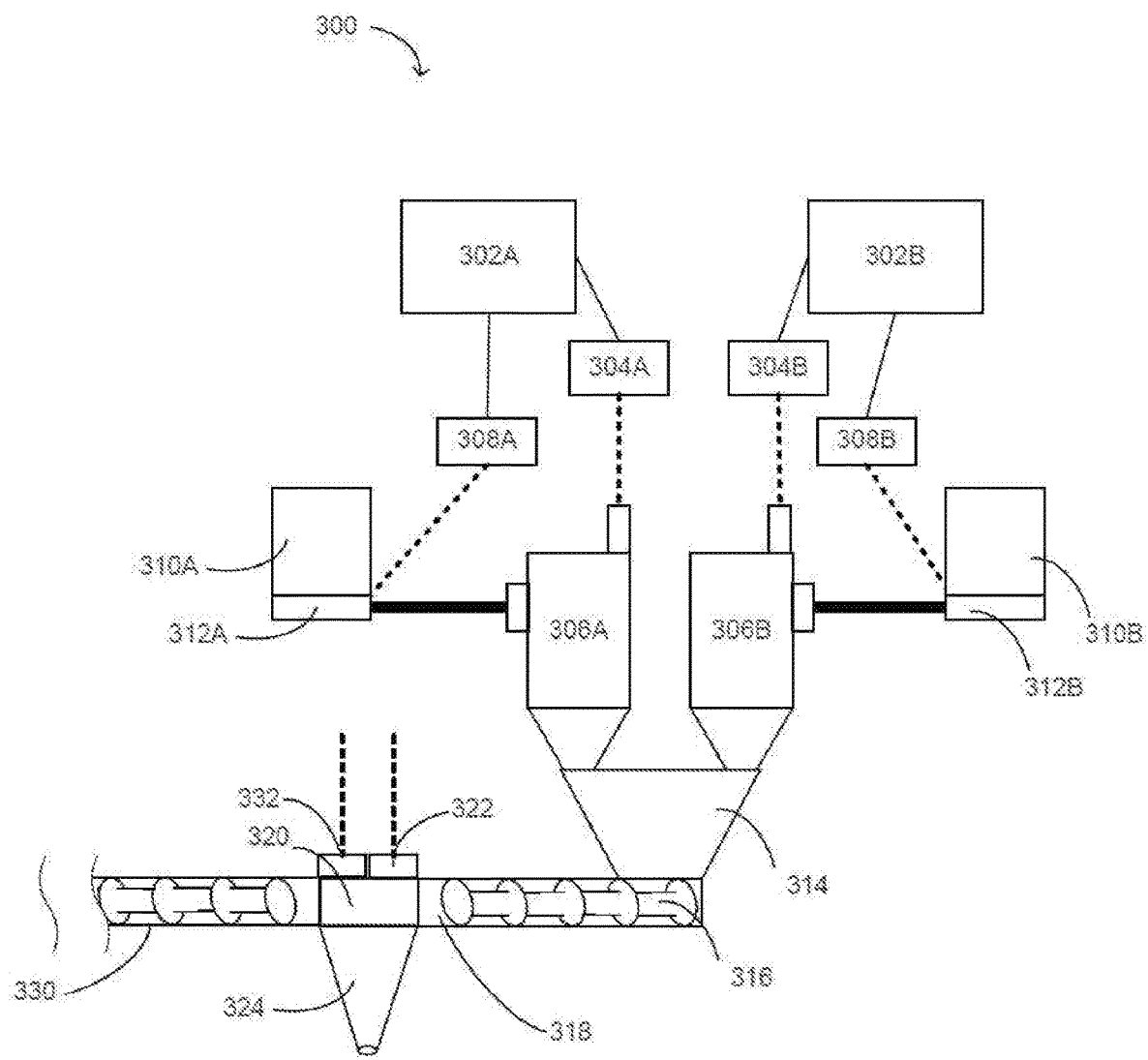
FIG. 3 is a diagram of an auger delivery and deposition system according to various embodiments.

FIG. 3 is a diagram of an auger delivery and deposition system 300 according to various embodiments. The auger delivery and deposition system 300 includes controllers 302A-B, material control valves 304A-B, material supply valves 306A-B, material flow control valves 308A-B, reservoirs 310A-B, material flow controls 312A-B, hopper 314, auger 316, fluid channel 318, deposition nozzle 320, deposition control input 322, and nozzle tip 324.

Material flow is controlled by the controllers 302A-B sending signals to the material flow control valves 308A-B to increase or decrease material flow from the reservoirs 310A-B. The material flows to and through the material delivery valves 306A-B based on control from the material control valves which actuate the material delivery valves 306A-B. As the material exits the material supply valves 306A-B, it enters the hopper 314. The hopper 314 may be integral to the material supply valves 306A-B, or may be a separate component in fluid communication. Material in the hopper 314 is allowed to mix, if desired, as it is fed into the auger 316 to get further mixed and pushed toward the deposition nozzle 320. According to some embodiments, the auger 316 can provide material to the deposition nozzle 320 at high pressure in excess of 100 psi so that viscous shear thinning materials may be more easily and precisely atomized for deposition. Atomization characteristics as described herein may be utilized by this system 300 in particular in the deposition nozzle 320.

According to various embodiments, the auger delivery and deposition system 300 includes additional material delivery components delivering varying materials to the deposition nozzle 320. An additional auger-based system 330 delivers another material as described above in series or in parallel (mixing in the deposition nozzle 320, or mixing in another chamber prior to entering the deposition nozzle 320). In embodiments where mixing occurs in the deposition nozzle 320, the deposition nozzle 320 includes additional deposition control inputs 332 to selectively control the flow of the material arriving from the additional auger-based system 330.

Figure 4:
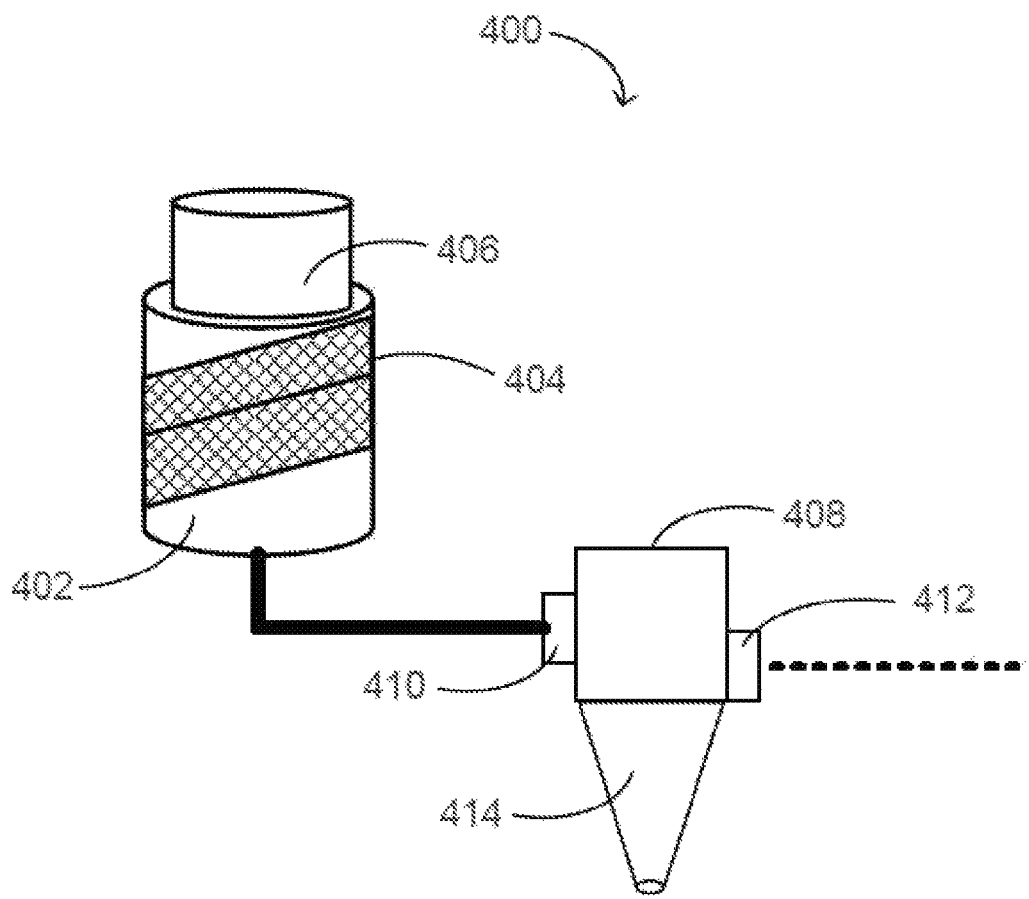
FIG. 4 is a diagram of a liquid material delivery and deposition system according to various embodiments.

FIG. 4 is a diagram of a liquid material delivery and deposition system 400 according to various embodiments. The liquid material delivery and deposition system 400 includes a reservoir 402, a heating element 404, a pressurizing element 406, and a deposition nozzle 408 having material inlet 410, control input 412 and nozzle tip 414.

Material awaiting deposition in the reservoir 402 is subject to heat by the heating element 404. The material is heated to a liquid state in order to reduce viscosity and allow for easy movement through the system 400. Generally, a critical temperature is preferred at which the surface tension of the material is reduced to a negligible amount (or eliminated). This temperature will differ for varying materials, but may be predetermined or determined on the fly through the use of sensors. The liquid material is subject to pressure from the pressurizing element 406 in order to move the material toward the material inlet 410 of the deposition nozzle 408. The pressure can also serve to reduce viscosity of shear thinning materials, aiding in atomization and droplet formation. The pressurized, liquidized material enters the deposition nozzle 408 through the material inlet 410 where it awaits deposition through the nozzle tip 414. According to various embodiments, an agitation element in the nozzle tip 414 is controlled by the control input. This agitation element will break up the material and also push it through the nozzle tip 414 in small amounts as droplets for deposition. According to other embodiments, the control input controls the flow of a gas (such as high pressure air) which is delivered to the material as it exits the nozzle tip 414 to aid in atomization and droplet formation.

As different materials are processed or multiple materials are processed in combination, the material characteristics change and thus deposition system variables are adjusted to achieve the desired deposition. With respect to these pure or combined materials, the droplet size/volume (V) exiting the nozzle tip 414 is controlled by controlling various deposition system parameters. The droplet volume is primarily influenced by two factors: the agitation force and the system pressure (See Equation 1 below). The material deposited from the agitation force is based on the structure of the actuation element in the nozzle tip 414. This deposition rate (Qm) can be controlled by changing the close time ($t_{close}$). The material deposition rate due to system pressure (Qp) can be calculated as well (See Equation 2), which is relies on the power law constants n and K of the material being deposited, the pressure delta ΔP between the system and the outside environment, and the deposition nozzle configuration—its diameter (D) and length (L). Overall the deposited volume then is the system pressure deposition rate (Qp) times the pulse time ($t_p$) plus the agitation force deposition rate (Qa) times the close time ($t_{close}$).

Temperature can affect the calculations, so it is kept at a level such that the surface tension of the material being deposited is reduced or effectively eliminated.

$$V = Q_a X t_{close} + Q_p X t_p \quad (1)$$

$$Q_P = \left(\frac{\pi D^3}{32}\right)\left(\frac{4n}{3n+1}\right)\left(\frac{D\Delta P}{4LK}\right)^{\frac{1}{n}} \quad (2)$$

By controlling the pressure and the open and close rate of the deposition nozzle, the volume of material may be precisely controlled. Adding the ability to control the force of the agitation, provides another control element. For a given material a particular pressure, deposition frequency (and duty cycle), agitation force and temperature (the "key characteristics") are used. As the material composition changes, controllers in the deposition system adjust these variables in kind to keep a uniform deposition of varying material. On-the-fly adjustment can be done with pre-programmed data about the materials being processed—an understanding of the characteristics of pure materials may be used to extrapolate the characteristics of mixed concentrations. According to other embodiments, sensors are used to determine the optimal key characteristics for the exact material/material combination being processed. According to some embodiments, these sensors are integrated into the liquid material delivery and deposition system 400 and fed back to enable key characteristic control in real time. According to other embodiments, the material/material combinations may be processed in an external or parallel test system to feed sensor data and/or key characteristics to the deposition system for optimal processing.

Figure 5:
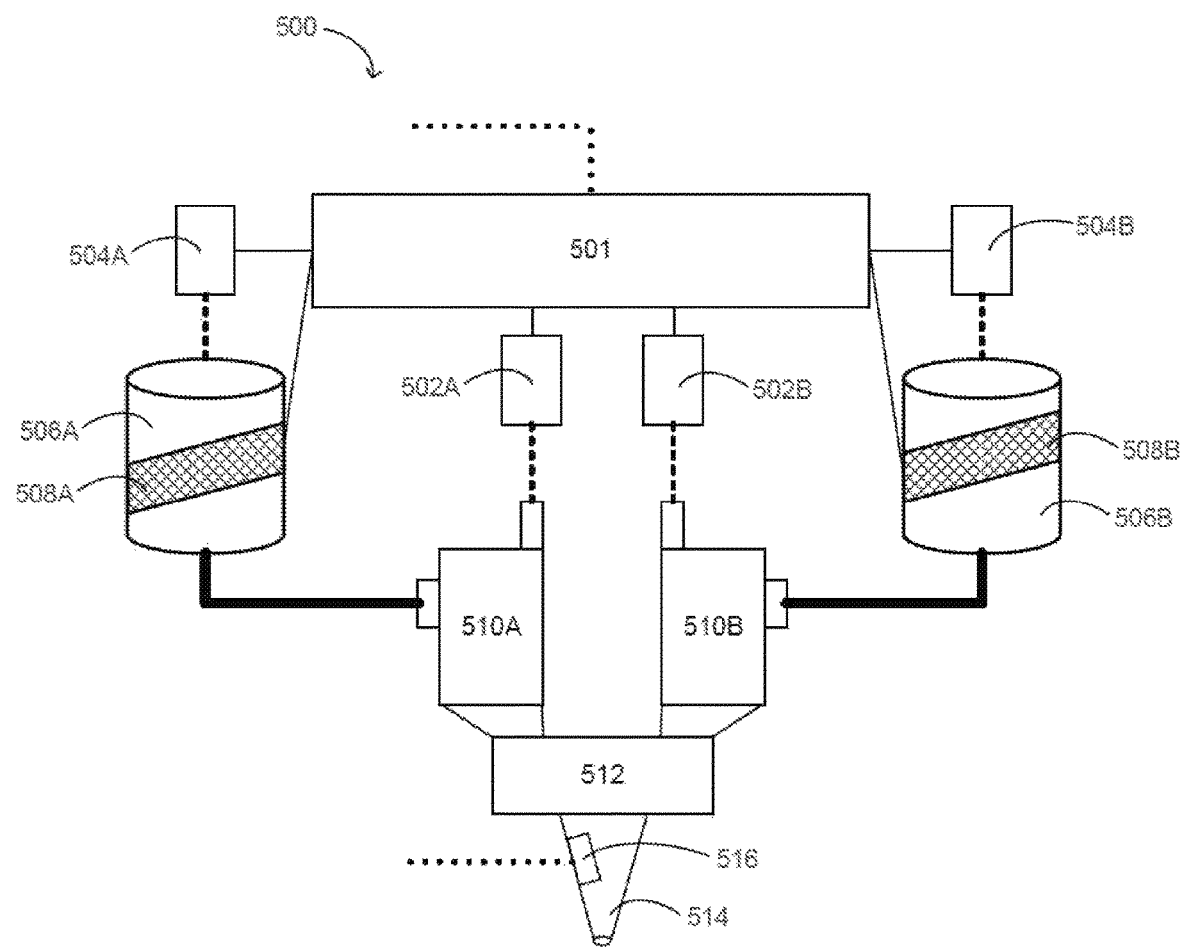
FIG. 5 is a diagram of a liquid multi-material delivery and deposition system according to various embodiments.

FIG. 5 is a diagram of a liquid multi-material delivery and deposition system 500 according to various embodiments. The liquid multi-material delivery and deposition system 500 includes a controller 501, material control valves 502A-B, pressure control valves 504A-B, reservoirs 506A-B, heating elements 508A-B, material delivery valves 510A-B, mixing chamber 512, nozzle tip 514 and deposition control element 516.

The controller 501 communicates with the material control valves 502A-B, the pressure control valves 504A-B, the heating elements 508A-B, and the deposition control element 514. According to some embodiments, the pressure control valves 504A-B are not used and the controller 501 communicates directly with mechanisms in the reservoir 506A-B to create pressure to move material. According to some embodiments, the material control valves 502A-B are not present and the controller 501 communicated directly with the material delivery valves 510A-B to control flow of material into a deposition nozzle. According to some embodiments where only a single material channel is used, both the material control valves 502A-B and the material delivery valves 510A-B are absent from the system 500, and material flow to the deposition nozzle is controlled through pressure in the reservoir 506A.

The controller 501 controls the pressure applied to the material, the heat applied to the material, the material flow and combination for deposition and the final deposition agitation (affecting speed and volume of deposition). By creating heat sufficient to liquefy a material through the heating element 508A, the controller 501 prepares the material for movement. The heat also serves to reduce or eliminate the surface tension of the material. The pressure applied by the pressure control valves 504A-B, controlled by the controller 501 moves the material while also thinning certain types of materials (shear thinning liquid polymers for example). Once the pressurized liquefied material reaches the material delivery valves 510A-B, the controller 501 actuates the valves to allow or restrict flow in order to achieve a desired material composition in the mixing chamber 512. Material in the mixing chamber 512 may mixed passively or with additional agitation. The mixed material flows to the nozzle tip 514 under pressure (and heat), where it encounters the deposition control element 516. The controller 501 communicates with the deposition control element to agitate and/or effect deposition of droplets of the material.

The deposition control element 516 controls the flow of material out of the nozzle tip 514. According to various embodiments, the deposition control element 516 provides an agitation and/or atomization effect upon the material as it exits the nozzle tip 514.

Figure 6:
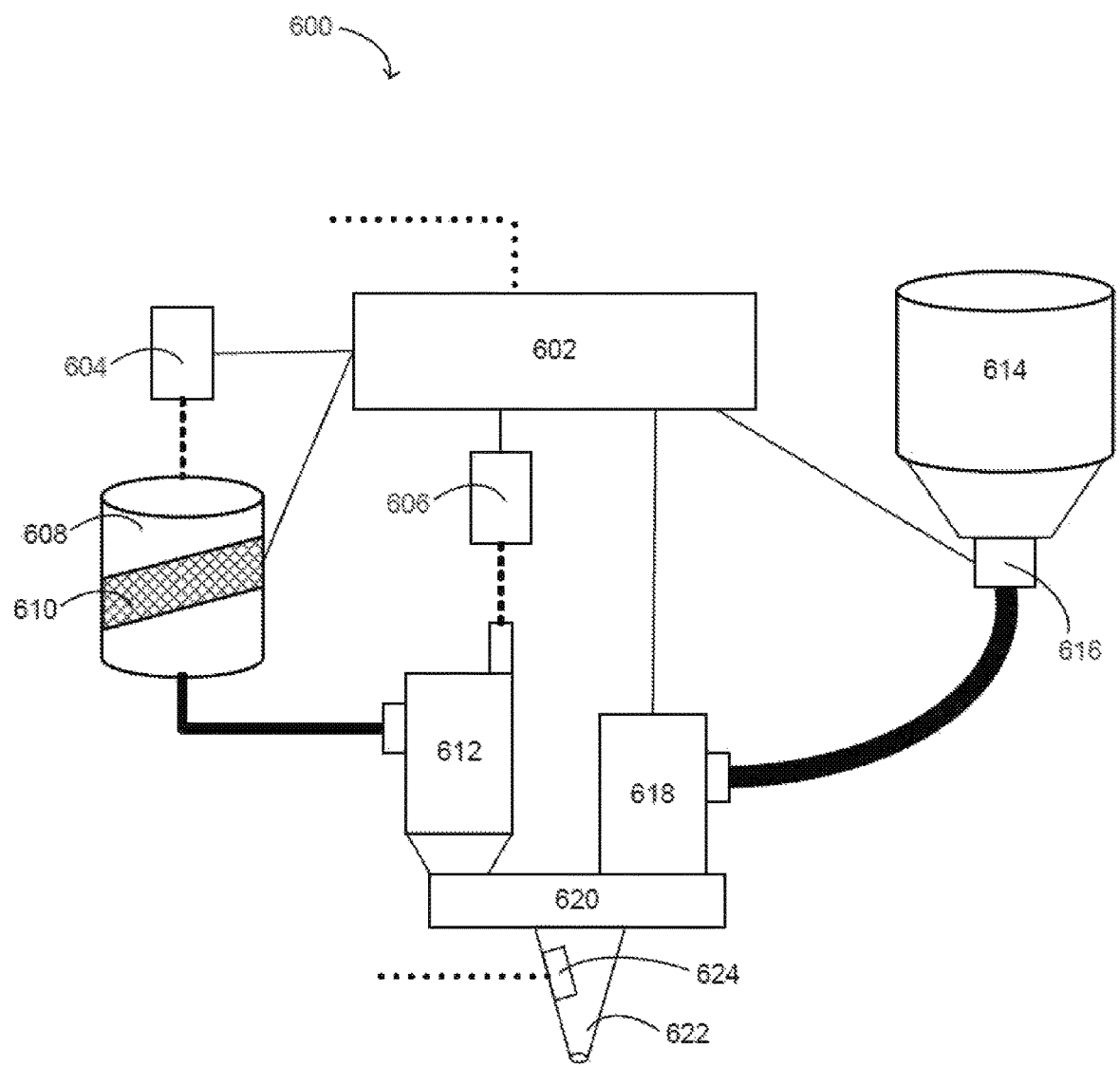
FIG. 6 is a diagram of a multi-material delivery and deposition system according to various embodiments.

FIG. 6 is a diagram of a multi-material delivery and deposition system 600 according to various embodiments. The multi-material delivery and deposition system 600 includes a controller 602, pressure control valve 604, a liquid delivery control valve 606, liquid reservoir 608, heating element 610, liquid delivery valve 612, solid material reservoir 614, solid material flow mechanism 616, solid material delivery mechanism 618, mixing chamber 620, nozzle tip 622 and deposition control element 624.

The multi-material delivery and deposition system 600 is similar to the liquid multi-material delivery and deposition system 500 (FIG. 5), except that it includes a solid material source in the system to allow the processing and deposition of a combined solid-liquid material. The multi-material delivery and deposition system 600 includes the liquid handling components described above with the addition of a solid material reservoir 614 connected to a solid material flow mechanism 616 controlled by the controller 602. At the demand of the controller 602, the solid material flows through the solid material flow mechanism 616 (which may be an auger or pump), into the solid material delivery mechanism 618 (valve device).

The controller 602 communicates with the solid material delivery mechanism 618 and the liquid delivery valve 612 to regulate flow of the liquid and solid materials. If a combined material is desired, the controller 602 allows both to flow into the mixing chamber 620 for combination as the combined material flows to the nozzle tip 622 for deposition. Here again, the deposition control element 624 provides agitation and deposition regulation based on control signals from the controller 602.

Figure 7:
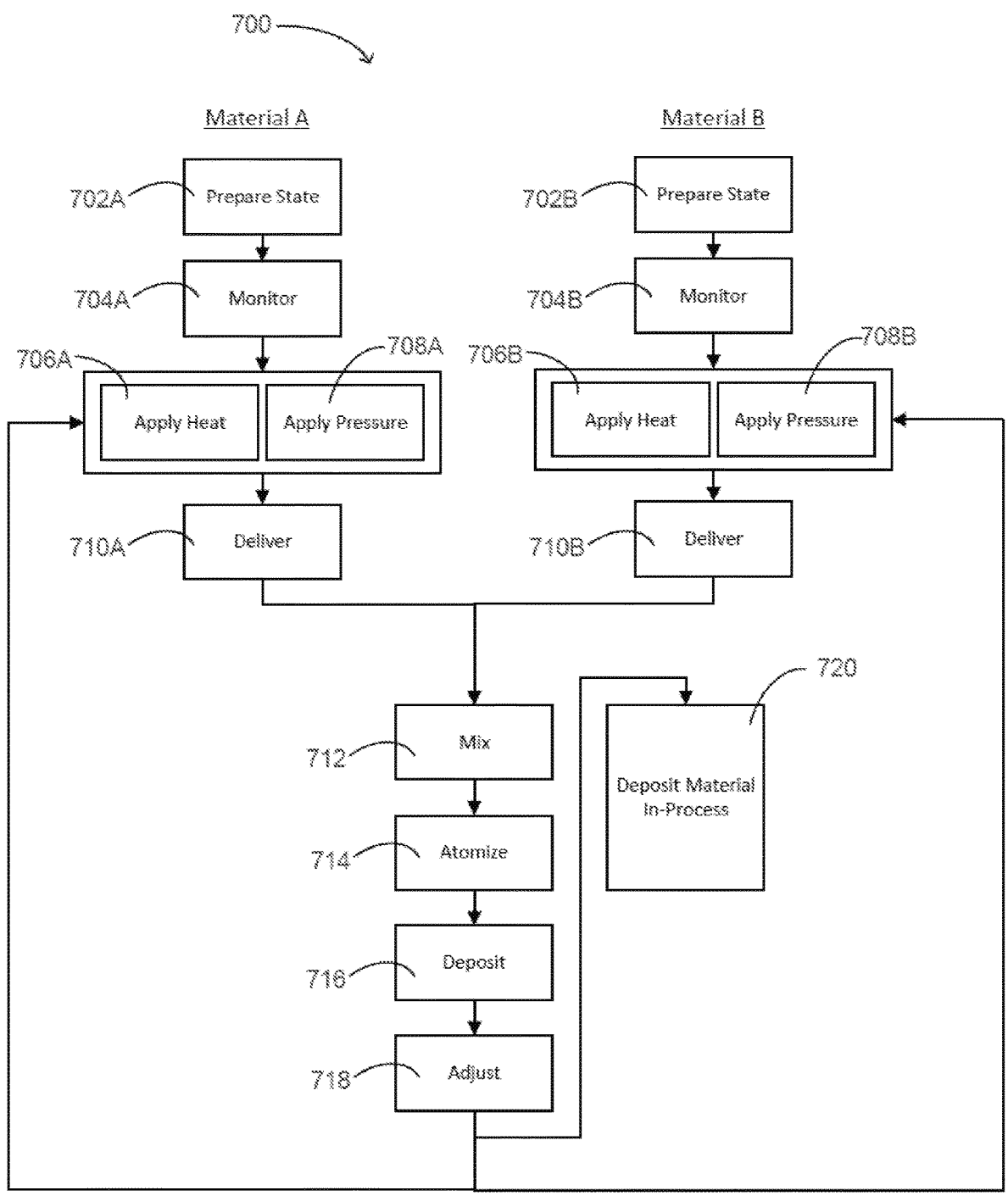
FIG. 7 is a flow diagram of a multi-material delivery and deposition process according to various embodiments.

FIG. 7 is a flow diagram of a multi-material delivery and deposition process 700 according to various embodiments. A material to be deposited is presented in a reservoir or some other storage medium and acted upon in order to prepare its state for delivery (box 702A-B). If the material is to be delivered in liquid state, generally the action will be thermal—a heating element is utilized, for example, to liquefy (or decrease viscosity) of the material. If the material is solid and the plan is to deliver in solid form (infused with a liquid for example), the material may need no action to prepare its state. A solid material may, however, be ground into a smaller or powdered form.

According to some embodiments, the material is monitored in its state to ensure the desired state and consistency (box 704A-B). Heat and pressure are used to move the material toward a deposition nozzle (boxes 706A-B, 708A-B). If the material is solid, heat may not be utilized, and pressure may be provided by a pump. The material is thusly delivered for deposition (box 710A-B). If multiple materials are being processed and combined, they meet either in a mixing chamber or in the deposition nozzle itself (box 712). Mixing is assisted by the pressures upon each material, but agitation from the atomization element in the deposition nozzle can also assist in mixing according to various embodiments. The mixed materials (or single material if only one material is being processed) are then agitated/broken up with an atomization element (box 714) to provide small resolution droplets for deposition (box 716).

At some point in the deposition process 700, an adjustment of the material being deposited is made (box 718). This adjustment can be done to change a material, material density, composition, mix . . . . A controller in the system will prepare for the change and adjust heat, pressure and/or atomization rate of one or multiple materials to effect the desired change. In the case of a material mix change, for example, the controller must take into consideration the current material in-process (meaning the material in front of the material having the new/adjusted characteristic. In this way, the controller prepares for depositing a new material composition by making an adjustment (box 718) and allowing the system to deposit the material in-process (box 720), after which the adjusted material will be deposited when and where desired. With each adjustment, the process is repeated.

Additional embodiments include sensors mounted within the system to feedback material characteristics, flow rates or deposition characteristics so that a controller may adjust operational variables such as temperature, pressure, agitation frequency, agitation force, deposition actuator duty cycle, and material composition. According to an example embodiment, a camera or scanner is utilized to look at printed material to feed back to the controller to adjust as the print is underway. In other embodiments, sensors mounted in the deposition nozzle, material delivery channels, and/or reservoirs are used to ensure optimal material state and consistency. In yet other embodiments, sensors external to the deposition nozzle monitoring the spray exiting the nozzle will feedback spray characteristics including droplet size, volume, flow rate and pattern.

In a first example, Example 1, a system for delivering material for deposition can include a hopper configured to hold a quantity of first material, an auger to move the first material from the hopper, a heating element in communication with the auger to heat the first material as it moves through the auger away from the hopper, a deposition nozzle to receive the heated first material through an input port, a material delivery mechanism to provide a second material to the deposition nozzle through an input port, and a controller in communication with the auger and the material delivery mechanism to control the delivery of the first material and the second material to the deposition nozzle. The deposition nozzle can be configured to deposit a combination of the first material and the second material.

In Example 2, the first material and the second material of Example 1 optionally are mixed before entering the deposition nozzle.

In Example 3, the system of Example 1 optionally includes a deposition control element in communication with the controller, the deposition control element to allow the first material and the second material to exit the deposition nozzle.

In Example 4, the system of Example 1 optionally includes an agitation element to atomize the first material and the second material as it exits the deposition nozzle.

Thus, example embodiments of the inventive subject matter are disclosed. One skilled in the art will appreciate that the present teachings can be practiced with embodiments other than those disclosed. Pneumatics and hydraulics are used as exemplary pressure sources, but it is considered that other pressure creating technologies may be used as well. Similarly, piezoelectric actuators, high pressure air, ultrasonic transducers and other agitation methods are used as an exemplary atomization element, but it is considered that agitation methods may be used as well. Additionally, heating elements may include external electro-resistive components, elements mounted in reservoir walls, fluid heating channels and other thermal delivery mechanisms. The disclosed embodiments are presented for purposes of illustration and not limitation, and the present teachings are limited only by the claims that follow.

The Abstract is provided to allow the reader to quickly ascertain the nature and gist of the technical disclosure. The Abstract is submitted with the understanding that it will not be used to interpret or limit the scope or meaning of the claims.

What is claimed is:

1. A system for printing a three-dimensional structure comprising:
    a first reservoir configured to hold a first material;
    a second reservoir configured to hold a second material;
    a first heating element to heat the first material;
    a first pressure delivery system configured to apply pressure to the first material;
    a second pressure delivery system configured to apply pressure to the second material;
    a deposition nozzle in fluid communication with the first reservoir and the second reservoir, the deposition nozzle to receive the first material and the second material;
    a deposition control element configured to deposit a combination of the first material and the second material through the deposition nozzle;
    a controller in communication with the first heating element, the first pressure delivery system, the second pressure delivery system and the deposition control element, the controller to control the first heating element, the first pressure delivery system, the second pressure delivery system and the deposition control element to allow the material to be deposited through the deposition nozzle with a ratio of the combination of the first and second material which is adjusted on-the-fly during the printing of the three-dimensional structure.

2. The system for printing a three-dimensional structure of claim 1, wherein the material characteristics of the first material and the second material are the characteristics of a mixed combination of the first material and the second material.

3. The system for printing a three-dimensional structure of claim 2, further comprising a sensor to determine characteristics of the mixed combination of the first material and the second material, wherein the determined characteristics are communicated to the controller.

4. The system for printing a three-dimensional structure of claim 2, wherein the controller adjusts on-the-fly during the printing of the three-dimensional structure, the first heating element, the first pressure delivery system, the second pressure delivery system or the deposition control element based on desired characteristics of the mixed combination of the first material and the second material which vary during the printing of the three-dimensional structure.

5. The system for printing a three-dimensional structure of claim 1, further comprising:
   a first valve in fluid communication with the first reservoir;
   a second valve in fluid communication with the second reservoir; and
   a flow control system in communication with the first valve and the second valve to selectively control the flow of the first material through the first valve and the second material through the second valve.

6. The system for printing a three-dimensional structure of claim 5, wherein in response to the flow control system adjusting the flow of the first material or the second material, the controller makes adjustments to one or more of the first heating element, the second heating element, the first pressure delivery system, the second pressure delivery system and the deposition control element.

7. The system for printing a three-dimensional structure of claim 1, wherein the first heating element is configured to liquify the first material.

8. The system for printing a three-dimensional structure of claim 7, including a second heating element to liquify the second material.

9. A system for printing a three-dimensional structure comprising:
   a deposition nozzle;
   a first delivery channel in communication with the deposition nozzle to deliver a first material to the deposition nozzle;
   a second delivery channel in communication with the deposition nozzle to deliver a second material to the deposition nozzle;
   a deposition control element connected to the deposition nozzle, the deposition control element configured to deposit a combination of the first material and the second material through the deposition nozzle; and
   a controller in communication with the first delivery channel, the second delivery channel and the deposition control element, the controller to adjust the ratio of the first material and the second material on-the fly during the printing of the three-dimensional structure by causing the first delivery channel to adjust a flow rate of the first material to the deposition nozzle, and by causing the second delivery channel to adjust a flow rate of the second material to the deposition nozzle, the controller to further adjust the deposition control element on-the fly during the printing of the three-dimensional structure to control the flow rate of the combination of the first material and the second material out of the deposition nozzle to print the three-dimensional structure.

10. The system for printing a three-dimensional structure of claim 9, wherein the controller adjusts the ratio of the first material and the second material on-the fly during the printing of the three-dimensional structure such that each deposited layer can have variable ratio of the first material and the second material.

* * * * *